United States Patent Office 2,727,038
Patented Dec. 13, 1955

2,727,038
2,5-DIMETHYL-1,4-PIPERAZINEDITHIO-CARBONYL DISULFIDE

John J. D'Amico, Charleston, W. Va., assignor to Monsanto Chemical Company, St. Louis, Mo., a corporation of Delaware No Drawing. Application April 6, 1954,
Serial No. 421,421

1 Claim. (Cl. 260—268)

This invention relates to 2,5-dimethyl-1,4-piperazine-dithiocarbonyl disulfide, a compound obtained by the oxidation of a salt of 2,5-dimethyl-1,4-piperazinedicarbo-dithioic acid, and to the method of preparation. The product has the empirical formula $C_8H_{12}N_2S_4$ although the molecule may be a multiple of this. For example, two possible structural formulae are:

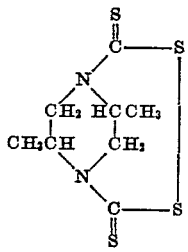

or

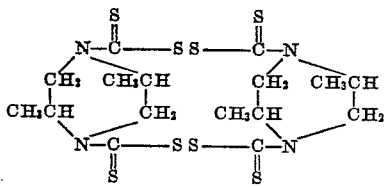

Soluble salts of 2,5-dimethyl-1,4-piperazinecarbodithioic acid are readily prepared by condensing one molecular proportion of 2,5-dimethylpiperazine and two molecular proportions of carbon disulfide in the presence of two molecular proportions of alkali metal hydroxide at 0–30° C. The sodium salt obtained from essentially trans 2,5-dimethylpiperazine was isolated as the trihydrate and possessed a melting point above 297° C. However, isolation of the intermediate is quite unnecessary. Oxidation in solution results in precipitation of the desired product. Examples of suitable oxidizing agents are sodium hypochlorite, chlorine, sodium nitrite and hydrogen peroxide. The following illustrates the reaction in detail:

To a solution containing 91.2 grams (0.25 mole) of disodium 2,5-dimethyl-1,4-piperazinedicarbodithioate trihydrate and 364 ml. of water, was added dropwise a solution containing 30 grams (0.258 mole) of 35% by volume hydrogen peroxide, 28 grams (0.265 mole) of 93% sulfuric acid and 250 ml. of water at 3–8° C. over a 90 minute period. The solid was filtered, washed with water until free of sulfate, and dried at 50° C. The product, melting point 218–220° C., was obtained in 98.2% yield. Analysis gave 10.56% nitrogen as compared to the theoretical value of 10.59%. The product is insoluble in water, ether, acetone, chloroform, benzene, ethyl acetate, heptane and ethyl alcohol.

The new compound is a useful adjuvant for the vulcanization of butyl rubber, a copolymer of isobutylene in the presence of a small proportion of a diene. Stocks were compounded comprising:

| Stock | A | B |
|---|---|---|
| Butyl rubber....................parts by weight.. | 100 | 100 |
| Carbon black.................................do.... | 54 | 54 |
| Zinc oxide....................................do.... | 5 | 5 |
| Stearic acid..................................do.... | 1 | 1 |
| Sulfur.........................................do.... | 1.5 | 1.5 |
| Mercaptobenzothiazole.....................do.... | 0.5 | |
| 2,5-Dimethyl-1,4-piperazinedithiocarbonyl disulfide parts by weight.. | | 4.0 |
| p-Quinone dioxime..........................do.... | 1.0 | 2.0 |

The stocks so compounded were cured for 30 minutes at 330° F. and found to possess the following physical properties:

Table I

| Stock | Modulus of Elasticity in lbs./in.² at Elongations of— | | | Tensile at Break in lbs./in.² | Ultimate Elongation, Percent |
|---|---|---|---|---|---|
| | 300% | 500% | 700% | | |
| A | 475 | 1,020 | 1,675 | 1,770 | 740 |
| B | 1,045 | 1,720 | -------- | 1,720 | 500 |

It is intended to cover all changes and modifications of the examples of the invention herein chosen for purposes of disclosure which do not constitute departures from the spirit and scope of the invention.

What is claimed is:

2,5-dimethyl-1,4-piperazinedithiocarbonyl disulfide.

References Cited in the file of this patent
UNITED STATES PATENTS

| 2,414,014 | Cable et al. | Aug. 7, 1947 |
| 2,561,208 | Kirk, Jr. | July 17, 1951 |